(12) United States Patent
Van Dijk

(10) Patent No.: US 11,714,984 B2
(45) Date of Patent: Aug. 1, 2023

(54) SYSTEM FOR DETERMINING POSITIONS OF A PLURALITY OF LABELS

(71) Applicant: Nedap N.V., Groenlo (NL)

(72) Inventor: Jeroen Martin Van Dijk, Enschede (NL)

(73) Assignee: NEDAP N.V., Groenlo (NL)

( * ) Notice: Subject to any disclaimer, the term of this patent is extended or adjusted under 35 U.S.C. 154(b) by 0 days.

(21) Appl. No.: 17/017,778

(22) Filed: Sep. 11, 2020

(65) Prior Publication Data

US 2021/0081735 A1 Mar. 18, 2021

(30) Foreign Application Priority Data

Sep. 12, 2019 (NL) ..................................... 2023820

(51) Int. Cl.
*G06K 19/06* (2006.01)
(52) U.S. Cl.
CPC ................................... *G06K 19/06* (2013.01)
(58) Field of Classification Search
CPC ..... G06K 19/06; A01K 11/006; G01S 5/0289; G01S 5/0036
See application file for complete search history.

(56) References Cited

U.S. PATENT DOCUMENTS

| | | | | |
|---|---|---|---|---|
| 5,241,923 A * | 9/1993 | Janning | ................ | A01K 27/009 |
| | | | | 119/908 |
| 5,959,568 A * | 9/1999 | Woolley | ................ | G01S 13/878 |
| | | | | 340/568.1 |
| 2007/0120671 A1 * | 5/2007 | Carmichael | .............. | G07C 9/28 |
| | | | | 340/8.1 |
| 2008/0291024 A1 * | 11/2008 | Zhang | ................... | G01S 5/0289 |
| | | | | 340/572.1 |
| 2009/0079633 A1 * | 3/2009 | Ward | ....................... | G01S 5/12 |
| | | | | 342/465 |
| 2010/0278087 A1 * | 11/2010 | Kawakami | ........ | H04W 52/0216 |
| | | | | 370/337 |
| 2011/0021146 A1 * | 1/2011 | Pernu | .................... | H04W 88/06 |
| | | | | 455/41.2 |
| 2013/0278440 A1 * | 10/2013 | Rubin | .............. | G08G 1/096791 |
| | | | | 340/903 |
| 2014/0125461 A1 * | 5/2014 | Liao | ...................... | G01S 13/878 |
| | | | | 340/10.1 |

(Continued)

FOREIGN PATENT DOCUMENTS

KR 20170095232 A * 8/2017 ............ H04W 74/04

*Primary Examiner* — Mohamed Barakat
*Assistant Examiner* — Rufus C Point
(74) *Attorney, Agent, or Firm* — Jacobson Holman, PLLC

(57) ABSTRACT

A system for determining positions of labels. Each label includes a processor and a transmitting and receiving device, and each label is configured for transmitting an electromagnetic first type beacon signal. The labels are also configured for receiving first type beacon signals from other labels, and for determining first type positioning data. The labels are also configured to transmit information about the positioning data. The system includes a receiver for receiving transmitted information about the positioning data, and a computer configured to calculate, on the basis of the received information, the relative positions of the labels relative to each other. The information about the relative positions of the labels can be exported by means of an electrical information signal.

31 Claims, 4 Drawing Sheets

(56) References Cited

U.S. PATENT DOCUMENTS

2014/0148196 A1\* 5/2014 Bassan-Eskenazi .......................... H04W 4/029 455/456.1
2018/0254825 A1\* 9/2018 Speidel .............. H04B 7/18582

\* cited by examiner

SYSTEM FOR DETERMINING POSITIONS OF A PLURALITY OF LABELS

BACKGROUND OF THE INVENTION

The present invention relates to a system for determining positions of a plurality of labels, each label comprising a processor and a transmitting and receiving device which is connected with the processor. Furthermore, the invention relates to a label.

Such systems are used for, among other purposes, the position determination, also: positioning, or objects in a space. In particular, such systems are used, for example, within livestock farming for the positioning of animals in a barn. Multiple beacons hung up at suitable points in the barn receive the signals from one or more labels, and by means of triangulation of transmitted signals the position of each label is determinable. Use is then made of, for example, radio frequency identification (RFID). Triangulation can either take place in the label when the labels include, for example, a processor and memory, or can take place centrally in the system, for example by triangulation of return signals received by the beacons from passive labels. The labels (also called 'tags') are worn by animals, so that with the aid of this system it is known where each animal is.

While the application of such systems within livestock farming brings many advantages with it as regards, for example, automation of the farm processes, the use of the beacons is not ideal. The position of the beacons should be accurately chosen to ensure that the beacon signal can be properly received throughout the space. Due to the beacons needing to hang sufficiently high, installation costs are high, for instance because use has to be made of tower wagons and long cables. Also, the transmitted power needs to be sufficiently high, in consequence of which the supply power is also high and the system hence consumes a relatively great deal of power and is little energy-efficient. For triangulation, at least three beacons are needed, but for obtaining accuracy and/or for complete coverage (by at least three beacons) in a large space, easily a greater number of beacons will be necessary. Also, the beacons themselves are relatively expensive, so that implementing such a system on an average-size stock farm requires a high investment.

SUMMARY OF THE INVENTION

It is an object of the present invention to obviate the disadvantages of the prior art and to provide a system for determining positions of a plurality of labels that is relatively simple to implement, is energy-efficient, and also provides sufficient accuracy.

To this end, the invention provides, according to a first aspect thereof, a system for determining positions of a plurality of labels, each label comprising a processor and a transmitting and receiving device which is connected with the processor, characterized in that each label is configured for transmitting with the transmitting and receiving device an electromagnetic first type beacon signal, and that each label is configured for receiving with the transmitting and receiving device an electromagnetic first type beacon signal which has been transmitted by another label, each label is configured to determine with the aid of the processor of the label first type positioning data, and that each label is configured to transmit with the transmitting and receiving device information about the first type positioning data determined by the processor of that label, wherein the system further comprises at least a receiver for receiving the information about the first type positioning data transmitted by the labels and a computer which is communicatively connected with the receiver, wherein at least one of the labels or the computer is configured to identify on the basis of the received first type beacon signal the label from which the received first type beacon signal originates, and wherein the computer is configured to calculate at least on the basis of information about the first type positioning data received with the receiver the relative positions of the labels relative to each other and to export information about the relative positions of the labels, in particular in the form of an electrical information signal.

The present invention makes use of the labels present in the system. The labels are each suitable for generating a beacon signal, each label being identifiable on the basis of the transmitted beacon signal. The beacon signal is to be received by other labels that are in sufficiently close proximity to the respective label. These receiving labels, on the basis of the received beacon signal, generate positioning data and forward this data to a receiver of the system. The receiver receives the transmitted positioning data from all labels, and sends this data to a computer which, on the basis of all received positioning data, determines per label what the exact position of that label is. In the system, each label is configured for generating an identifiable beacon signal and also to receive beacon signals from other labels, to generate positioning data therefrom, and to forward the data to the receiver. Thus the computer can determine the mutual positions of all labels from this received data. For this, it is not necessary to equip the system with powerful beacons as in the systems according to the state of the art.

The identifiability of the labels on the basis of the transmitted first type beacon signals can take place in different ways. As will be further explained in the present disclosure, identification can take place in a preferred embodiment by having each of the labels transmit the first type beacon signal in its own timeslot within a transmission period. During that timeslot, the other labels receive only the transmitted beacon signal and do not themselves transmit anything. The transmitting label is then identifiable on the basis of the assigned timeslot. Of course, in an alternative embodiment, also an identification code may be sent along with the beacon signal. This makes the labels a bit more advanced because in this last embodiment the label has to be suitably designed for this purpose (the labels must store the unique code and be able to incorporate it in the signal and send it along with the signal). Identification via an assigned timeslot may be implemented in different manners, which will be further elucidated hereinafter.

In the system according to the invention, the labels are able, by means of mutual exchange of the signals, to jointly determine the mutual relative positions of all labels. For this, as explained, no fixed beacons are needed. However, to be able to determine not only the relative positions but also the absolute positions of all labels, it is necessary to have knowledge of the absolute positions of at least two of the labels. For this, use can be made of fixed beacons, but this may also be implemented in a different way. When the absolute position data of at least two labels are made known in the system in a different way, the use of fixed beacons for obtaining absolute position data is superfluous. In that case, in effect, the function of the beacons is fulfilled by the at least two labels whose absolute position data are already known. These absolute position data of the at least two labels can be obtained in different manners.

According to an embodiment, the at least two of the labels are, for instance, in a known position, this absolute position then being stored in the system. It is possible, for example, to place two or more labels at a position known in the system, and to make it knowable to the system where each of the at least two labels is. For example, the system may comprise two or more charging points whose absolute positions are known in the system. When a label is placed in one of the charging points, it is directly known that the respective label is in this absolute position. When, accordingly, two or more labels have been placed in respective charging points in this way, for each of these labels the absolute position is known in the system. By combining the data of these known absolute positions of the respective labels with the data of the mutual relative positions as determined in the system, the absolute position of all labels is known in the system.

The above example of a charging point is just an embodiment. Because the labels have their own accumulator or battery, an embodiment as described here is simple to implement. Indeed, the connecting of a label to a charger can be simply automatically reported back to the system, so that the system is directly informed of the absolute current position of this label. In another embodiment, of course, the absolute position of some labels may also be determined in a different way. It is possible, for example, to detect a label with the aid of camera pictures. Also, a user can report the absolute location of a label to the system, for example from a mobile phone, a tablet, a laptop or any other mobile operating unit, or from the label itself. Labels can also establish their own absolute position, for example through detecting an identification signal that can be received exclusively from a particular location. Also, in some embodiments, the absolute position of some labels may for instance be determined when an animal wearing the label is at a known position, for example, when a cow is being milked by a milking robot the label is also close to the milking robot. As described, there are different manners in which establishing of the absolute positions of the at least two labels can be implemented.

The use of labels in the system to fulfill the function of fixed beacons, for providing absolute position data as a reference for determining the absolute positions of all labels, will be further discussed further on in this disclosure.

The mutual relative position of each transmitting label can be determined in the system from the positioning data as generated by three or more receiving labels. It provides advantages, however, to do positioning on the basis of a larger number of receiving labels, and the system according to the present invention makes this simply possible in that all labels present in the system determine their positions mutually. The more labels there are within the transmission range of the transmitting label, the more accurately the positioning of the transmitting label can take place, since the measuring statistics are augmented in this manner. Certainly when there are a great number of labels about within the system, positioning can be carried out with very high accuracy. This accuracy can be used, if so desired, to ease the requirements regarding, for example, the signal strength of the transmitting labels, or to be able to compensate for signal reflection and interference resulting from any obstacles present.

In exceptional situations, for that matter, fewer than three receiving labels may suffice for obtaining a rough estimate of the position of a transmitting label. Positioning is still possible, in principle, on the basis of the positioning data of two receiving labels; in that case, however, it can only be done by compensating for the lacking positioning data by supplementing the data with other data or by making an assumption. One of the assumptions that can be made is that the positions of animals are within a specific height from the floor: the animals may be standing, lying or sitting, and are not all equally tall, so there is a certain range in height from the floor within which all labels must be present. Another assumption may be that the animals must in any case be inside the barn. On the ground of such assumptions the position of each label can be determined on the basis of positioning data of two receiving labels, albeit with some (acceptable) uncertainty. Below, in principle, the assumed starting point will be positioning data of at least three receiving labels for triangulating; however, the invention can also be applied by making use of the positioning data of two receiving labels, supplemented with other data or with assumptions. The invention is therefore not limited to triangulation based on the positioning data of at least three receiving labels.

The sending of the positioning data to the receiver can take place in different manners. In a first embodiment, each label can generate a sufficiently strong transmitted signal that is received by the receiver. Also, it is possible, according to another embodiment, that the transmitted signal with positioning data of each label is forwarded via the other labels until it can reach a receiver (similarly to the forwarding of data in a relay network). In the first embodiment, preferably, the transmitted power of each label is sufficiently great to reach the receiver. In the second embodiment, the transmitted power can remain smaller, but the data rate for transmitting and receiving data of each of the labels should be sufficiently high to be able to receive the signals from all labels and retransmit them. An advantage of the first embodiment is that the transmitting system can be relatively simply operative. An advantage of the second embodiment is that the coverage of the network is better and the chance that all signals reach the receiver is much greater. A label can only be outside the range of the receiver when an animal separates itself from the group sufficiently far.

According to embodiments, the positioning data as determinable by each label with the aid of the processor comprises one or more data from a group comprising: information about the signal strength of a first type beacon signal received with that label, possibly in combination with information about the signal strength with which the first type beacon signal was transmitted and/or information about the time at which the first type beacon signal was received, possibly in combination with the time at which the first type beacon signal was transmitted. This data can be advantageously used for establishing the exact position of a label, if combined with such data received from other labels.

According to some embodiments, the system is configured such that, in use, each first type beacon signal is transmitted with a predetermined signal strength known within the system, while the first type positioning data determined with the processor comprises information about the strength with which the first type beacon signal was received; and/or that each first type beacon signal comprises information about what signal strength the first type beacon signal was transmitted with, while the first type positioning data determined with the processor comprises this information together with information about the signal strength with which the respective first type beacon signal was received. These embodiments make it possible to determine the position of the labels on the basis of signal attenuation of the received beacon signals. Because the beacon signal is transmitted from the source—the transmitting label—omnidirectionally, the transmitted power decreases as the square of the distance from the source. When the initial strength of the signal is known, the signal attenuation can be calculated on the basis of the reception strength, and hence also the distance to the source—the transmitting label—can be determined. By combining the positioning data as determined by three (or more) receiving labels, the distance of the transmitting label to each of the receiving labels is known, and the position of the transmitting label can be determined.

According to some embodiments, the system is configured such that, in use, each first type beacon signal is transmitted at a predetermined time known within the system, while the first type positioning data determined with the processor comprises information about the time at which the first type beacon signal was received and/or that each first type beacon signal comprises information about the time at which the first type beacon signal was transmitted, while the first type positioning data determined with the processor comprises this information together with information about the time at which the respective first type beacon signal was received. These embodiments make it possible to determine the position of the labels on the basis of time of flight of the received beacon signals. When the exact time of transmission of the signal is known, it can be determined from the exact reception time of different receiving labels what the distance of each of those labels to the transmitting label is. In some embodiments, the time-of-flight data as described above can be combined with the signal strength data as described in preceding embodiments, for augmenting the accuracy of positioning.

In some of the above-mentioned embodiments, each label is provided with a clock to determine when a label transmits the first type beacon signal. This data can then be sent along with the beacon signal to be processed by the receiving labels or, in an alternative embodiment, be sent to the receiver directly so that the computer can process this data.

According to some embodiments, the system further comprises a plurality of fixedly disposed beacons, while each beacon is configured to transmit a second type beacon signal, each label is configured to receive the second type beacon signal with the aid of the transmitting and receiving device of the label, and the system is configured to determine for at least two of the labels, at least on the basis of the second type beacon signals received by the at least two labels, a position of the at least two labels relative to the beacons. The second type beacon signals may also be identifiable, for example, based on time of transmission, based on a particular transmission characteristic, or through incorporation of an identification code of the beacon.

While in the above embodiments the mutual distances between the labels and hence their relative positions with respect to each other can be properly determined, information regarding the position of at least two labels is necessary to be able to determine the positions of the other labels in an absolute sense as well. To this end, the system according to these embodiments may yet make use of a few fixed beacons whose absolute position is fixed and is known in the system. However, the fixed beacons do not need to comply with the stringent requirements that beacons in conventional systems have to comply with. In principle, a beacon provided with a transmitter as is also present in the labels suffices. As has already been discussed above, therefore, in some embodiments the beacons can be formed by labels whose position is known in the system.

These labels whose absolute positions are known can in the same way receive and process the transmitted signals from the other labels, to be able to establish the positions of all other labels. That is why the computer, according to some embodiments, is configured for, on the basis of the calculated relative positions of the labels relative to each other and the determined position of the at least two labels relative to the beacons, determining the relative positions of the labels relative to the beacons, while the information about the relative positions of the labels exported by the computer comprises the relative positions of the labels relative to the beacons.

According to some of the above embodiments, each label is configured to determine with the processor, on the basis of second type beacon signals received with the transmitting and receiving device of the respective label, its position relative to the beacons, and to transmit information about the determined position with the transmitting and receiving device to the receiver, while the computer is configured to process received information about the position of at least two labels relative to the beacons in combination with the received information about the first type positioning data of the labels, for determining the positions of the labels relative to the beacons.

Furthermore, according to some specific embodiments, each label is configured to determine with the processor, on the basis of second type beacon signals received with the transmitting and receiving device of the respective label, second type positioning data such as the strengths of the received second type beacon signals, possibly in combination with information about the signal strengths with which the second type beacon signals were transmitted and/or information about the time at which a received second type beacon signal was received, possibly in combination with information about the times at which the second type beacon signals were transmitted, and then transmit this with the transmitting and receiving device to the receiver, while the computer is configured to process this received information in combination with at least the received information about the first type positioning data and/or the determined relative positions of the labels, for determining the positions of the labels relative to the beacons.

This embodiment may be combined with other embodiments for obtaining additional accuracy. For example, in specific ones of the above embodiments, the system is configured such that, in use, each second type beacon signal is transmitted with a predetermined signal strength known within the system, while the second type positioning data determined with the processor comprises information about the strength with which the second type beacon signal was received; and/or that each second type beacon signal comprises information about what signal strength the second type beacon signal was transmitted with, while the second type positioning data determined with the processor comprises this information together with information about the signal strength with which the second type beacon signal was received.

In accordance with yet another example, in some specific ones of the above embodiments, the system is configured such that, in use, each second type beacon signal is transmitted at a predetermined time known within the system, while the second type positioning data determined with the processor comprises information about the time at which the second type beacon signal was received and/or that each second type beacon signal comprises information about the time at which the second type beacon signal was transmitted, while the second type positioning data determined with the processor comprises this information together with information about the time at which the second beacon signal was received.

According to further embodiments, the first type beacon signals and the second type beacon signals are identical, while one or more beacons are formed by fixedly disposed labels. When the first and second type beacon signals are identical, beacons in the system can always be formed by or replaced with a label. This makes the system technically simpler and, moreover, easier to implement.

In accordance with embodiments already described hereinabove, in use of the system, a plurality of the labels are fixedly disposed and thus function as beacons, with the absolute positions of each label of the plurality of fixedly disposed labels being known within the system, while the system is configured to determine for at least two of the labels, on the basis of the first type beacon signals of the fixedly disposed labels received by the at least two labels, a position of each of the at least two labels relative to the fixedly disposed labels.

In accordance with an embodiment, the system is configured such that the labels respectively, successively, one after another transmit the first type beacon signal. The labels may for instance be numbered or be assigned a serial number, with the labels in sequential order transmitting their beacon signals while the other labels listen. If each label can receive the signals from the other labels, in this way in a system of 100 labels, per positioning round 100*100=10,000 measuring points can be obtained and as many as 1,000,000 given a farm of 1,000 cows. The accuracy of positioning is thus obtained in particular from the statistic of measuring points: a great number of measuring points enable a very accurate determination of the position of each label.

According to some embodiments, the system is configured such that the labels respectively, one after another, transmit the first type beacon signal during one or more transmission periods. For example, in accordance with some implementations of the system, each label is provided with an electronic clock, with the clocks of the labels mutually synchronized and with the transmission period divided into timeslots, while each of the labels has been assigned a unique timeslot within the, or each, transmission period for transmitting the first type beacon signal. Each label is then identifiable in the system, for example on the basis of the timeslot in which the label sent the first type beacon signal. According to a specific embodiment, each label is for instance provided with an electronic clock, with the clocks of the labels mutually synchronized and with the labels, on the basis of signals generated by the clocks, transmitting respectively, one after another, the first type beacon signal. The labels, in this way, are independently able to determine the proper timeslot within which the first type beacon signal is to be transmitted.

Synchronization can take place in various manners. For example, in some systems, the labels can be synchronized once at initialization of a system, or periodically, for example at charging of a label in a charging station. Synchronization can take place, for example, every second or every 10 or 100 milliseconds. In accordance with some embodiments, however, the system is configured for transmitting a synchronization signal, while each label is configured for receiving the synchronization signal and for synchronizing the electronic clock of the label on the basis of the synchronization signal. The synchronization signal may be transmitted with a dedicated transmitter, but it is also possible for one or more of the labels to be configured for generating the synchronization signal. For example, a label may be configured to generate a synchronization signal upon instruction from the system, or, for example, upon request of a neighboring label which has been synchronized less recently. Also, in an embodiment in which one or more labels are used as fixed beacons, these labels may be configured to generate a synchronization signal. Mutual synchronization of the labels may also be effected via the labels themselves, without central control. This may be done, for example, through exchange of synchronization signals between the labels. When, for example, a label at time $t_1$ sends a synchronization signal which is received by another label at time $t_2$ (the clocks of the labels having an unknown mutual time deviation relative to each other), and in reply the other label returns a synchronization signal at time $t_3$ which is received at time $t_4$ by the one label, it can be determined from the registered times $t_1$, $t_2$, $t_3$ and $t_4$ what the mutual time deviation between the clocks of the labels is (this time deviation in an absolute sense equals $(t_2-t_1+t_4-t_3)/2$). When all labels perform a synchronization procedure in this way, the clocks of the labels can be accurately synchronized relative to each other.

Accurate synchronization is of interest to keep the transmission duration of the labels as short as possible and consequently reduce energy consumption. This is not only energy-saving but also prolongs the useful life of the labels that is feasible between two charging moments of the internal battery. This last is of interest to prevent the labels on the animals needing to be replaced unduly often.

According to an embodiment, the system is configured such that, in use, a label only transmits an update of first type positioning data. In that case, no positioning data are transmitted when there has been no change or insufficient change in the positions of other labels. The amount of data can be strongly reduced in this way, without loss of accuracy.

According to some embodiments of the system, the transmitting and receiving device of each label is configured for transmitting and receiving electromagnetic signals with a frequency of between 300 MHz and 3,000 MHz, preferably between 300 MHz and 1,000 MHz, for example with a frequency of 434 MHz, 868 MHz or 922 MHz. Such labels are already widely available and can be made suitable to be operative within a system according to the invention. The system according to the invention is able, despite the inherent erratic nature of the signals in this band, yet to make an accurate position determination based on the transmitted first type beacon signals. This is because the number of labels together provide a measuring statistic that is sufficiently large to compensate for inaccuracies in the signal.

According to some embodiments of the system, the transmitting and receiving device of each label is configured for transmitting and receiving electromagnetic signals with a frequency of less than 500 kHz, for example with a frequency of 400 kHz. At these frequencies, the transmitted signals are hardly if at all hindered by reflections and/or unpredictable damping. Positioning based on this signal can therefore be done relatively accurately, even with a limited measuring statistic. While a disadvantage of these frequencies is the limited transmission range, this is made up for by accurate positioning being possible with a relatively small number of receiving labels. Due to the labels being able to mutually relay the obtained position information until a beacon is reached, the system can yet collect all position information of all labels.

In a specific embodiment, each label is configured for, during at least a part of a duration of the transmission of the electromagnetic first type beacon signal, sending the electromagnetic first type beacon signal such that it comprises merely a carrier wave. By, for instance, sequentially for each of the labels, temporarily leaving out any data in the signal and merely sending a carrier wave as first type beacon signal, it is yet known in the system what label transmits the first type beacon signal, since the transmitting label is the label that is associated with the timeslot. An advantage is further that the signal now merely comprises the carrier wave and, as described earlier, is hardly if at all hindered by reflections and/or unpredictable damping. Positioning is therefore accurately possible, even with a smaller number of labels (for example, three or more labels).

Furthermore, the above-described system may be designed on the basis of ultra-wideband (UWB). While UWB-based systems have a smaller transmission range, this suffices for the system described here. Ultra-wide band is for instance used for interim transfer of information which, in use, is stored in the labels (for example, activity data or health status data of the animal) to a livestock management system by making use of UWB readers. The reader yields not only the actual data, but also a signal strength with which the data was received. The measured UHF signal strengths can thus be used within a system according to the present invention when the labels can receive the UWB signal from other labels and can determine the signal strength therefrom.

Further, as already mentioned before, according to some embodiments, each label may be configured for sending along with the first type beacon signal an identification code for identifying the respective label. In that case, identification takes place directly by reading a received first type beacon signal.

According to a second aspect, the invention provides a label for use in a system as described above. In accordance with some embodiments, the invention provides a label comprising a processor and a transmitting and receiving device which is connected with the processor, characterized in that the label is configured for transmitting with the transmitting and receiving device an electromagnetic first type beacon signal, each label is configured for receiving with the transmitting and receiving device an electromagnetic first type beacon signal which has been transmitted by another label, each label is configured for, with the aid of the processor of the label, determining first type positioning data such as information about the signal strength of a first type beacon signal received with that label, possibly in combination with information about the signal strength with which the first type beacon signal was transmitted and/or information about the time at which the first type beacon signal was received, possibly in combination with the time at which the first type beacon signal was transmitted, and that each label is configured to transmit with the transmitting and receiving device information about the first type positioning data determined by the processor of that label.

DESCRIPTION OF THE FIGURES

The invention will be discussed below on the basis of specific embodiments thereof not intended as limiting, with reference to the appended figures, in which.

DETAILED DESCRIPTION OF THE INVENTION

Figure 1:
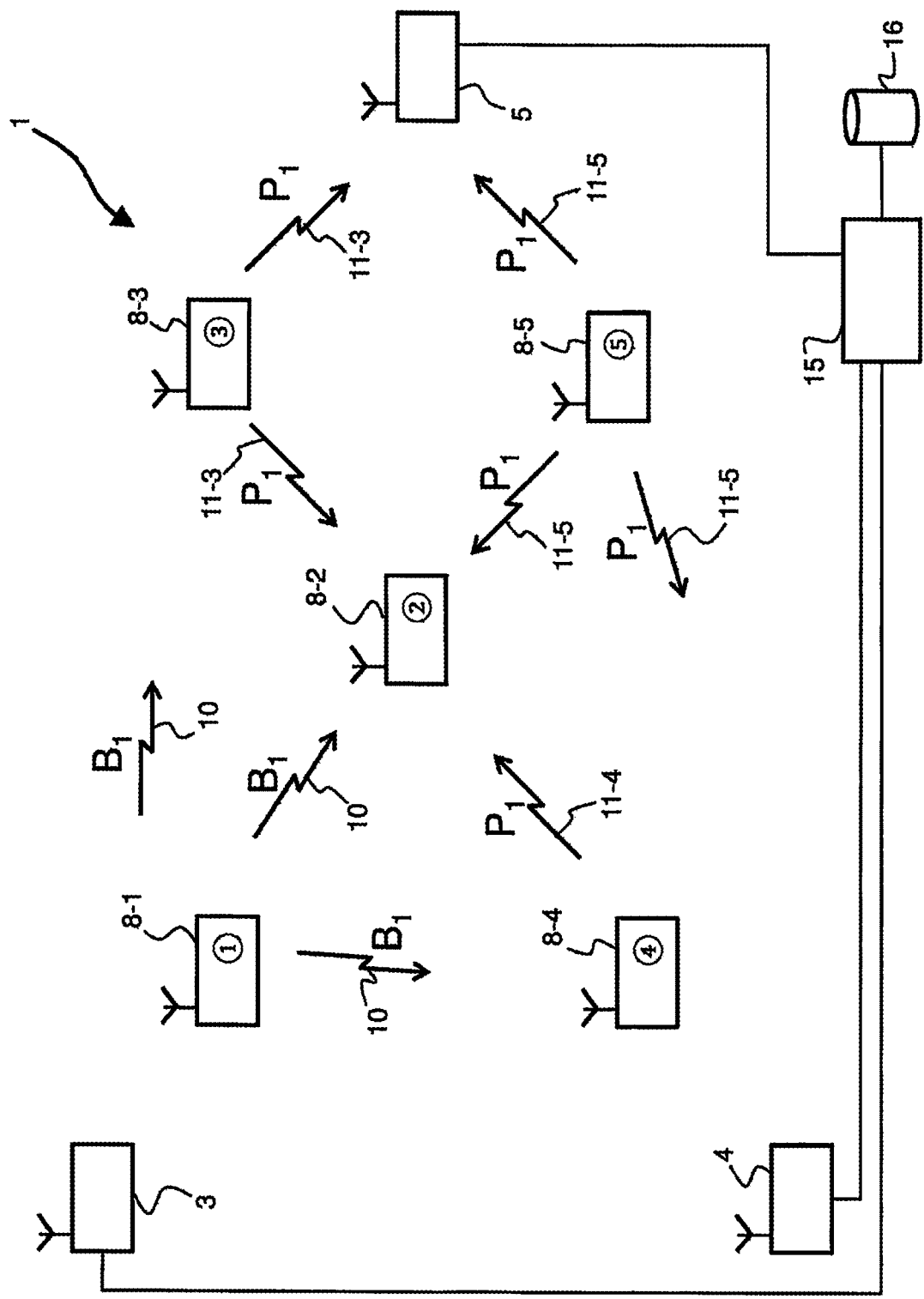
FIG. 1 is a schematic representation of a system according to an embodiment of the present invention.

FIG. 1 shows a system 1 according to an embodiment of the present invention. In FIG. 1 the system 1 is represented with three receivers 3, 4 and 5 which also function as fixed beacons for system 1. The receivers/beacons 3, 4 and 5 are at different places in a space. Furthermore, the system comprises five labels 8-1, 8-2, 8-3, 8-4 and 8-5. The receivers/beacons 3, 4 and 5 are communicatively connected through a wired network to a computer 15 provided with memory 16. In lieu of a wired network, the connections between the receivers/beacons 3-5 and the computer 15 may also be formed by means of wireless connections via, for example, a Wi-Fi network. The receivers 3, 4 and 5 are configured for receiving signals which have been transmitted by the labels 8-1 through 8-5. In FIG. 1 system 1 is drawn with just five labels, but this has been done merely to be able to represent the working principle. In reality, the system 1 can include any desired number of labels, ranging from one label to 1,000 or 10,000 or 100,000 labels.

The working of system 1 for determining the positions, also called positioning, of a plurality of labels 8-1 through 8-5 is as follows. Each of the labels 8-1 through 8-5 is configured to generate a beacon signal which can be received by the other labels 8. Preferably, the beacon signals of different labels are not simultaneously transmitted but sequentially. This can be achieved in different manners. Thus, for example, with a certain time frequency a positioning round can be carried out, where the time per round is divided into timeslots, and each label 8-1 through 8-5 is assigned a unique timeslot. For example, label 8-1 may be assigned the first timeslot, so that this label will always start transmitting its beacon signal. In FIG. 1 this sequential order for label 8-1 is indicated with CD. The order for labels 8-2 through 8-5 is correspondingly indicated with ⓐ, ⓐ, ® and ®.

In FIG. 1, the situation during the first timeslot is represented. Label 8-1 sends its beacon signal 10 (in the drawing also indicated as $B_1$). This beacon signal contains data regarding the transmitted power (for example, −50 dBm) with which the beacon signal 10 was transmitted. The beacon signal 10 can be received by each of the other labels 8-2 through 8-5. Upon reception of beacon signal 10, each label 8-2 through 8-5 will determine an RSSI value (remote signal strength indicator (RSSI)) of the signal. Because the beacon signal 10 contains data regarding the original transmitted power, each label 8-2 through 8-5 can determine the signal attenuation with the aid of an internal processor. This information is forwarded as positioning data by way of a positioning signal for label 8-1. In FIG. 1, there are shown the positioning signal 11-3 of label 8-3, the positioning signal 11-4 of label 8-4, and the positioning signal 11-5 of label 8-5. Label 8-2 also transmits a positioning signal for label 8-1. The positioning signals can be received by the receivers 3, 4 and 5. These will forward the positioning data to computer 15 and memory 16 for further processing and storage.

The labels 8-1 through 8-5 may be provided with an internal clock on the basis of which the assigned timeslot for transmission of the beacon signal 10 can be determined. Synchronization of the clocks of all labels in the system should preferably be as accurate as possible, because this makes the system more energy-efficient. The internal clocks of all labels 8-1 through 8-5 may for example be synchronized once with each other and with the system time of the system 1 (for example as monitored by the computer 15). Also, it is possible to synchronize the internal clocks with the system time periodically, for example when the labels are in a charging station or in the proximity of labels which have been synchronized more recently. In the latter case, the labels 8-1 through 8-5 synchronize their internal clocks relative to each other. Interim mutual synchronization is also possible through exchange of synchronization signals between the labels. When, for example, label 8-1 at time $t_1$ sends a synchronization signal which is received by label 8-2 at time $t_2$ (the clock of label 8-2 having an unknown time deviation relative to the clock of 8-1), and in reply the label 8-2 sends a synchronization signal back to 8-1 at time $t_3$ which is received at time $t_4$, it can be determined from the registered times $t_1$, $t_2$, $t_3$ and $t_4$ what the time deviation of the clock of label 8-2 relative to that of label 8-1 is (time deviation=$(t_2-t_1+t_4-t_3)/2$).

Optionally, however, the system 1 may also be configured for generating a synchronization signal. With this synchronization signal the transmission of beacon signals in accordance with assigned timeslots can be coordinated. One or more of the beacons 3, 4 and/or 5 may, for example, generate a synchronization signal. This may consist of, for example, a single starting signal, or a continuous or periodical synchronization signal. The synchronization signal can be received by the labels 8-1 through 8-5. On the basis of the synchronization signal, each label is able to determine the timeslot assigned to the respective label for transmitting a beacon signal 10. For example, in the system 1 a predetermined timeslot duration of x milliseconds may be set for the duration of each timeslot. The duration x can have any suitably chosen value, for example a value between 1 and 20. Suppose, for example, that it has been set in the system that x=3 and hence that a timeslot lasts three milliseconds. Label 8-1 has been assigned serial number CD (n=1) and it can hence start sending its beacon signal 10-1 during the first timeslot. Label 8-1 therefore starts directly after reception of the synchronization signal, so after t=(n−1)*x milliseconds where n=1 and x=3 and so t=0 milliseconds, to send its beacon signal 10-1. Label 8-5 has serial number n=5, so that the beacon signal 10-5 is transmitted by label 8-5 at time t=(5−1)*3=12 milliseconds.

While each label 8 is sending a beacon signal 10 during its assigned timeslot, the other labels 8 listen and determine, for example, the reception strength of the received signal 10. In that case, the beacon signals of the labels 8-1 through 8-5 do not need to comprise any identification code, because it can be determined on the basis of the timeslot what label is currently sending a beacon signal. For example, during the first, timeslot, label 8-1 sends its beacon signal 10-1 and labels 8-2 through 8-5 listen with a view to receiving the signal 10-1. The signal 10-1, within the assigned timeslot, identifiably originates from label 8-1 and may contain data regarding the transmitted power. Upon reception, each label 8-2 through 8-5 determines the signal strength of the received signal. This information, possibly together with the payload from the received transmitted signal 10-1, is added to the payload of a return signal to be generated: the positioning signal 11. So, for example, label 8-2 generates positioning signal 11-2, and this positioning signal has as payload the transmitted signal strength from the data of signal 10-1, the received signal strength of the signal 10-1 as received by label 8-2, and optionally the timeslot number (if it is not already known to the system). Further, label 8-3 generates positioning signal 11-3, and this positioning signal has as payload the transmitted signal strength from the data of signal 10-1, the received signal strength of the signal 10-1 as received by label 8-3, and optionally the timeslot number of reception. Furthermore, label 8-4 generates positioning signal 11-4, and this positioning signal has as payload the transmitted signal strength from the data of signal 10-1, the received signal strength of the signal 10-1 as received by label 8-4, and optionally the timeslot number of reception. Also, furthermore, label 8-5 generates positioning signal 11-5, and this positioning signal has as payload the transmitted signal strength from the data of signal 10-1, the received signal strength of the signal 10-1 as received by label 8-5, and optionally the timeslot number of reception. These positioning signals are received by beacons 3, 4 and 5. On the basis of the timeslot in which the beacon signal was sent, this information is assignable to label 8-1.

In an alternative embodiment, it is also possible that the signals do comprise identification codes of the labels 8-1 through 8-5. For example, in that case, during the first timeslot, label 8-1 sends its beacon signal 10-1 and labels 8-2 through 8-5 listen with a view to receiving the signal 10-1. The signal 10-1 includes inter alia an identification code Y1 of label 8-1 and can contain data regarding the transmitted power. Upon reception, each label 8-2 through 8-5 determines the signal strength of the received signal. This information, together with an identification code for the respective receiving label and the payload from the received transmitted signal 10-1, is added to the payload of a return signal to be generated: the positioning signal 11. So, for example, label 8-2 generates positioning signal 11-2, and this positioning signal has as payload the transmitted signal strength from the data of signal 10-1, the received signal strength of the signal 10-1 as received by label 8-2, the identification code Y2 of label 8-2, and the identification code Y1 of label 8-1. Further, label 8-3 generates positioning signal 11-3, and this positioning signal has as payload the transmitted signal strength from the data of signal 10-1, the received signal strength of the signal 10-1 as received by label 8-3, the identification code Y3 of label 8-3, and the identification code Y1 of label 8-1. Furthermore, label 8-4 generates positioning signal 11-4, and this positioning signal has as payload the transmitted signal strength from the data of signal 10-1, the received signal strength of the signal 10-1 as received by label 8-4, the identification code Y4 of label 8-4, and the identification code Y1 of label 8-1. Also, furthermore, label 8-5 generates positioning signal 11-5, and this positioning signal has as payload the transmitted signal strength from the data of signal 10-1, the received signal strength of the signal 10-1 as received by label 8-5, the identification code Y5 of label 8-5, and the identification code Y1 of label 8-1. These positioning signals are received by beacons 3, 4 and 5.

The signals 11-2 through 11-5, in this last case, may also be sent by the labels 8-2 through 8-5 at the same time. For upon reception, the signals can be separated on the basis of the identification code sent along with them. In a known manner, this can also be done also by assigning the signals their own channel or phase, but also by using a coding of signals. In another embodiment, the signals may also be transmitted in succession, with the duration of the timeslot needing to be sufficiently long to be able to transmit all signals. The time duration of the timeslot may then, for example, be accordingly tuned to this in the system.

Instead of or additionally to being operative on the basis of transmitted power, the present invention may also be operative on the basis of time of flight. This, however, requires an accurately synchronizable system clock that is available in each label.

Figure 2:
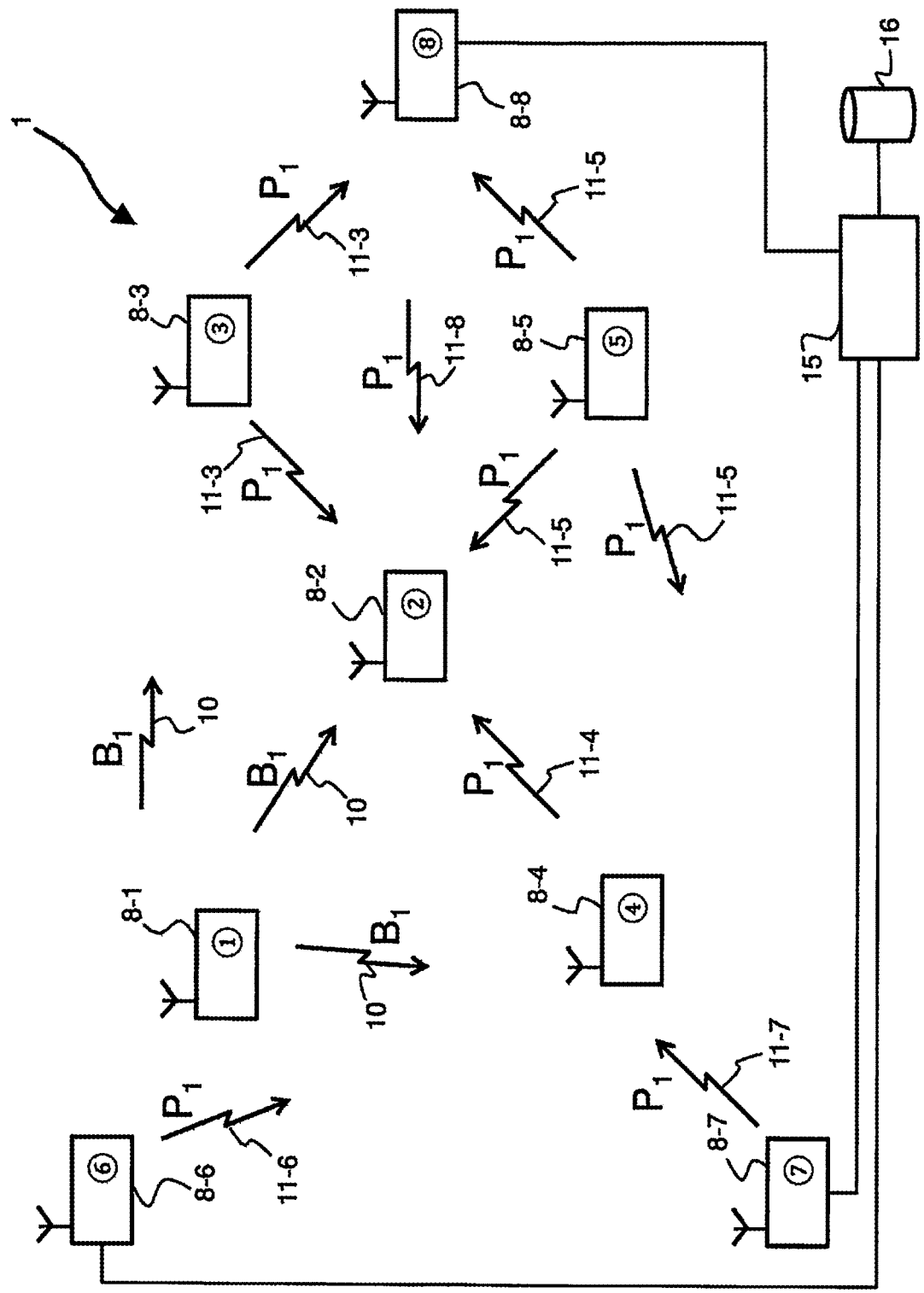
FIG. 2 is a schematic representation of a system according to a further embodiment of the present invention.

In FIG. 2, an alternative embodiment of the system 1 according to the invention is shown. The fixed beacons 3, 4 and 5 from FIG. 1, which also do duty as receivers in the system 1 of FIG. 1, are absent here. The function of these beacons is fulfilled in the system 1 of FIG. 2 by labels 8-6, 8-7 and 8-8 which have been placed in fixed positions. The absolute position data of these fixed positions are known in the system 1, and may for instance be stored by computer 15 in memory 16. For the rest, the labels 8-6 through 8-8 take part in the mutual communication between the labels 8 in the same way as described above for FIG. 1. In FIG. 2, further, the positioning signals 11-6, 11-7 and 11-8 of labels 8-6, 8-7 and 8-8 respectively are shown. Also, in each of the labels 8-6, 8-7 and 8-8 the respective serial number @, O and ® for transmitting a beacon signal 10 is represented.

Accordingly, in system 1 in FIG. 2 the absolute position of the labels 8-6 through 8-8 is known, and the mutual relative positions of all labels 8-1 through 8-8 can be determined. With this, the system can also determine the absolute positions of the other labels 8-1 through 8-5. For this manner of determining absolute positions of all labels 8, the absolute position of at least two labels should be known.

As described earlier, there are different methods of determining the absolute position data of the beacons 8-6, 8-7 and 8-8. For this purpose, as described hereinabove, use can be made, for instance, of a charging station, of camera pictures, of data inputted by a user, or of data to be detected by the label.

Synchronization of the labels 8-1 through 8-8 in a system 1 as shown in FIG. 2 can take place in a same manner as in the system 1 according to FIG. 1. The labels can hence be synchronized, for example, once, or periodically when a label 8 is in a charging station. Also mutual synchronization of the labels 8, for instance, as indicated, on the basis of the most recently synchronized label 8, is a possibility. Also in the embodiment of FIG. 2, the system 1 may include means for generating a synchronization signal. The system 1 may for instance, via computer 15, instruct one or more of the labels 8-6 through 8-8 to generate such synchronization signal which can be received by the other labels 8-1 through 8-8. Alternatively, it is also possible that the system 1 includes one fixed transmitter or transmitting antenna (not shown in FIG. 2) for transmitting such a synchronization signal. The use of a synchronization signal can take place in the same way as described for the embodiment in FIG. 1.

The synchronization signal which, in accordance with some embodiments, can be used in a system 1 according to the invention (for instance as shown in FIG. 1 or 2), may, as indicated, consist of a starting signal on the basis of which the labels 8 themselves monitor when they are allowed to send their beacon signals 10. It can also be a continuous or periodical synchronization signal on the basis of which the internal clock of each label 8 is synchronized, and which, for instance, can also be used by the labels 8 to determine when the beacon signal 10 is to be sent in conformity with the timeslot assigned to them. A person skilled in the art will understand how such a synchronization signal can be implemented.

In the embodiments of the system 1 in which a synchronization signal is applied, it will preferably be applied exclusively for that function: synchronizing the labels for application of positioning as described. In some embodiments, moreover, additionally to this function, the synchronization signal itself can also be used for positioning. Thus, for instance, the synchronization signal can be transmitted with a transmitted power known in the system, and the labels 8 which receive the synchronization signal can periodically report the reception strength of the synchronization signal back to computer 15. When the synchronization signal is transmitted from a fixed transmitter whose location is known in the system, this will generate an additional fixed position point on the basis of which an absolute position determination can be made. In that case, just at least one other fixed known position point is then needed to be able to find all other absolute positions of the labels 8. So in that case the synchronization signal provides one of the at least two known fixed absolute positions that are needed for absolute position determination.

Figure 3A:
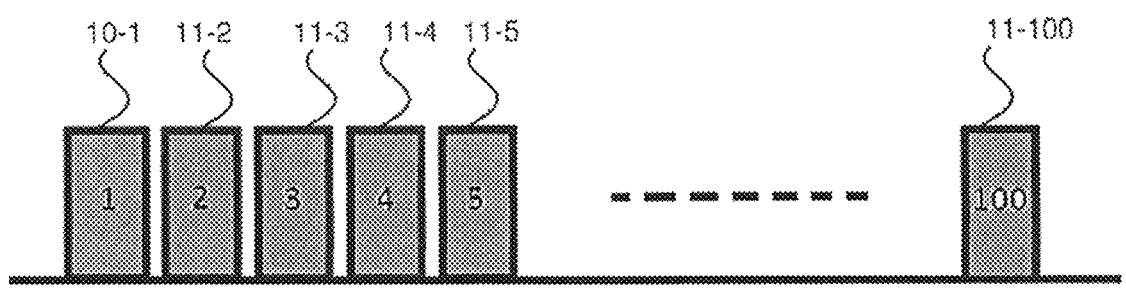
FIGS. 3A and 3B represent two timeslots within a positioning round carried out with a system according to an embodiment of the present invention.
Figure 3B:
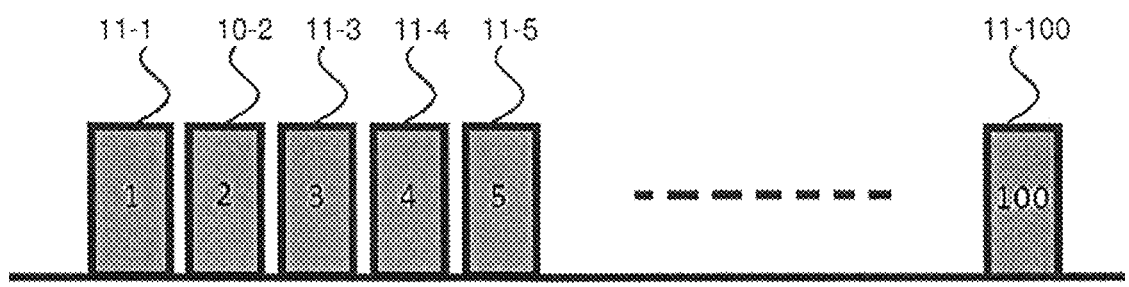

FIGS. 3A and 3B show the first two timeslots in a system 1 according to the present invention, which includes one hundred labels. As represented in FIG. 3A, in the first timeslot, label 8-1 will generate a beacon signal 10-1. The other labels 8-2 through 8-100 listen out the beacon signal, and process it during this timeslot and transmit a positioning signal 11-2 through 11-100. In the second timeslot, in FIG. 3B, it is label 8-2 that sends a beacon signal 10-2 while the other labels send positioning signals 11-1, and 11-3 through 11-100.

Figure 4:
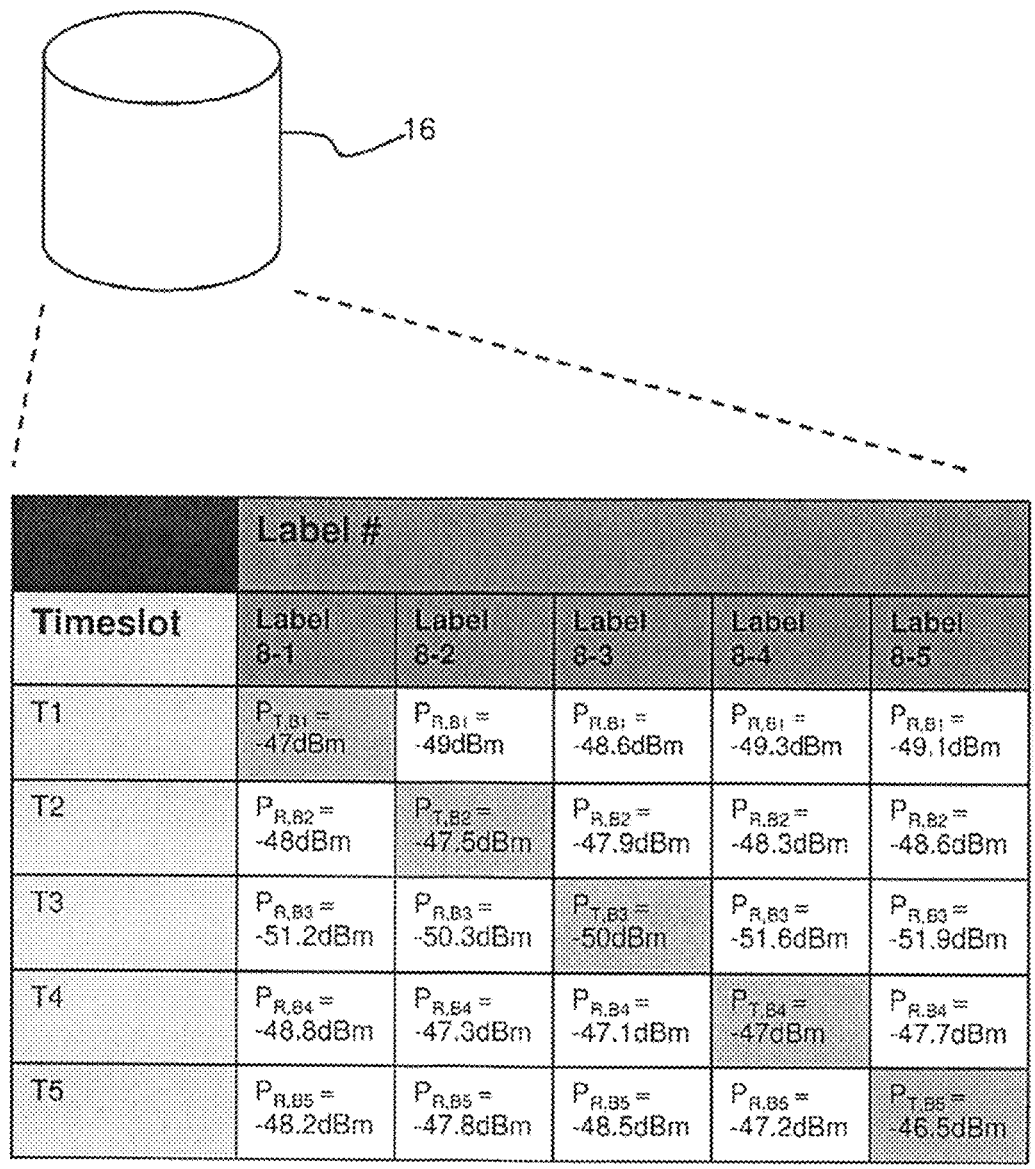
FIG. 4 shows a data matrix of signal strengths of transmitted and received signals, as stored in a memory of a system according to an embodiment of the invention.

When in this way in a system 1 according to FIGS. 1 and 2 a positioning round is carried out, the computer 15 will fill a data matrix as represented in FIG. 4. The matrix in FIG. 4 shows the timeslots T1 through T5 in the first column, each timeslot T1-T5 having a row assigned to it. Each of the labels 8-1 through 8-5 present in the system has a column assigned to it, as represented in the header of the matrix. The signal strengths of the transmitted beacon signals for each label 8-1 through 8-5 can be found in the matrix in the cells along the diagonal. For example, the signal strength of the transmitted beacon signal of label 8-1 is indicated in FIG. 4 as $P_{T,B1}$ where 'P' stands for "power", the subscript T for "transmitted", and the subscript B1 indicates the signal B1 in FIG. 1. The cells along the diagonal further provide $P_{T,B2}$ for label 8-2, $P_{T,B3}$ for label 8-3, $P_{T,B4}$ for label 8-4 and $P_{T,B5}$ for label 8-5. The received signal strengths at each receiving label 8-1 through 8-5 are indicated for each timeslot in the cells of the corresponding row. For example, the second left cell in the row for timeslot T1 gives the signal strength of the signal B1 from label 8-1 such as it was received by label 8-2, indicated with $P_{R,B1}$ (P for "power", R for "received" and B1 for the signal B1 from label 8-1). The division of a matrix as shown in FIG. 4, of course, can be chosen freely, and the invention is not limited to any particular division. The signal strengths of transmitted signals, for that matter, may also be stored in the memory in a way other than in the matrix of FIG. 4. In that case, the cells along the diagonal are empty.

On the basis of the information in the matrix, the mutual relative position of each label 8-1 through 8-5 can be accurately determined. This information may be supplemented with absolute position information of at least two beacons 3, 4 or 5 as in FIG. 1, or with absolute position information of at least two labels 8-6, 8-7 and 8-8 which are at a fixed location known in the system, as in FIG. 2. With this additional information, also the absolute position of each of the other labels 8-1 through 8-5 can be determined. A label 8, such as labels 8-6, 8-7 and 8-8 in FIG. 2, which is placed at a location known in the system, can do duty as a beacon and at the same time in the same manner receive and process beacon signals from other labels. Thus, labels in a charging station can for instance do duty as beacons when the location of the charging station is known in the system. It is therefore, though possible, not necessary to install special beacons, because, if desired, labels 8 from the system can suffice.

While the beacon signals from the labels 8-1 through 8-5 in the matrix of FIG. 4, for instance as a result of a difference in battery voltage, have each been transmitted with just a bit different transmitted power, positioning is yet possible by normalizing each received signal strength on the basis of the transmitted signal strength. The normalized signal strengths can be mutually compared with each other.

For a system according to the present invention it holds that the greater the number of labels 8, the greater the amount of data and the greater the measuring statistic. This augments the accuracy of the measurement.

The system according to some embodiments can be operative with RFID labels 8 which exchange signals via the UHF band, preferably between 300 MHz and 3,000 MHz, more preferably between 300 and 1,000 MHz, in particular, for example, 434 MHz, 868 MHz or 922 MHz. The advantage is that such labels are already widely available and could be made suitable to be operative within the system 1. A disadvantage is that the signals in this band are known to be erratic, and individual signals may entail an inaccuracy for positioning of a few tens of meters. This is an unduly high inaccuracy. However, the large amount of statistics that is available in a system according to the present invention in this case makes a reliable measurement possible nonetheless.

The system could also, in accordance with some embodiments, be operative in the low-frequency range up to 500 kHz, for example at 400 kHz. At this low frequency, each label could very briefly switch on a carrier only signal. As a result, it can be seen within a radius of about five meters what labels (animals) are in the vicinity. This can be done very accurately because at these frequencies there are no reflections and unpredictable damping. The position is now merely known very locally, but by collecting information about all cows/labels, it is yet known where all labels are.

Furthermore, the above-described system may be designed on an ultra-wide band (UWB) basis. While UWB-based systems have a smaller transmission range, this suffices for the system described here.

The above-described specific embodiments of the invention are intended to illustrate the inventive principle. The invention is only limited by the appended claims.

The invention claimed is:

1. A system for determining positions of a plurality of labels, each label comprising a processor and a transmitting and receiving device which is connected with the processor, wherein each label is configured for transmitting with the transmitting and receiving device an electromagnetic first type beacon signal, and that each label is configured for receiving with the transmitting and receiving device an electromagnetic first type beacon signal which has been transmitted by another label, each label is configured to determine first type positioning data based on the received electromagnetic first type beacon signal with the aid of the processor of that label, and that each label is configured to transmit with the transmitting and receiving device the first type positioning data determined by the processor of that label, wherein the system is configured such that the labels respectively, one after another, transmit the first type of beacon signal during one more transmission periods; and wherein each label is provided with an electronic clock, where the electronic clocks of the labels are mutually synchronized and wherein the transmission period is divided into timeslots and wherein each of the labels is assigned a unique timeslot within the, or each, transmission period for sending the first type beacon signal, wherein the system further comprises at least a receiver for receiving the first type positioning data transmitted by the labels and a computer which is communicatively connected with the receiver, wherein at least one of the labels or the computer is configured to identify, by associating a timeslot wherein the received electromagnetic first type beacon signal is received with an assigned unique time slot, the label from which the received first type electromagnetic beacon signal originates, and wherein the computer is configured to calculate, at least on the basis of the first type positioning data received with the receiver, relative positions of the labels relative to each other and to export information about the relative positions of the labels, in particular in the form of an electrical information signal.

2. The system according to claim 1, wherein the system is configured such that, in use, each electromagnetic first type beacon signal is transmitted with a predetermined signal strength known within the system, wherein the first type positioning data determined with the processor comprises information about the strength with which the electromagnetic first type beacon signal was received; and/or that each electromagnetic first type beacon signal comprises information about what signal strength the electromagnetic first type beacon signal was transmitted with, wherein the first type positioning data determined with the processor comprises this information together with information about the signal strength with which the respective electromagnetic first type beacon signal was received.

3. The system according to claim 1, wherein the system is configured such that, in use, each electromagnetic first type beacon signal is transmitted at a predetermined time known within the system, wherein the first type positioning data determined with the processor comprises information about the time at which the electromagnetic first type beacon signal was received and/or that in each electromagnetic first type beacon signal comprises information about the time at which the electromagnetic first type beacon signal was transmitted, wherein the first type positioning data determined with the processor comprises this information together with information about the time at which the respective electromagnetic first type beacon signal was received.

4. The system according to claim 3, wherein each label is provided with a clock to determine when a label transmits the electromagnetic first type beacon signal.

5. The system according to claim 1, wherein the system further comprises a plurality of fixedly disposed beacons, wherein each beacon is configured to transmit a second type beacon signal from the beacon, wherein each label is configured to receive the second type beacon signal with the aid of the transmitting and receiving device of the label, and wherein the system is configured to determine for at least two of the labels, at least on the basis of the second type beacon signals received by the at least two labels, a position of the at least two labels relative to the beacons.

6. The system according to claim 5, wherein the computer is configured for, on the basis of calculated relative positions of the labels relative to each other and determined position of the at least two labels relative to the beacons, determining the relative positions of the labels relative to the beacons, wherein the information about relative positions of the labels exported by the computer comprises the relative positions of the labels relative to the beacons.

7. The system according to claim 6, wherein each label is configured to determine with the processor, on the basis of second type beacon signals received with the transmitting and receiving device of the respective label, its position relative to the beacons, and to transmit information about the determined position with the transmitting and receiving device to the receiver, wherein the computer is configured to process received information about the position of at least two labels relative to the beacons in combination with the received information about the first type positioning data of the labels, for determining the positions of the labels relative to the beacons.

8. The system according to claim 6, wherein each label is configured to determine with the processor, on basis of the second type beacon signals received with the transmitting and receiving device of the respective label, second type positioning data such as the strengths of the received second type beacon signals, possibly in combination with information about the signal strengths with which the second type beacon signals and then to transmit this with the transmitting and receiving device to the receiver,
- wherein the computer is configured to process this received information in combination with at least the received first type positioning data and/or the determined relative positions of the labels, for determining the positions of the labels relative to the beacons.

9. The system according to claim 8, wherein the system is configured such that, in use, each second type beacon signal is transmitted with a predetermined signal strength known within the system, wherein the second type positioning data determined with the processor comprises information about the strength with which the second type beacon signal was received; and/or that each second type beacon signal comprises information about what signal strength the second type beacon signal was transmitted with, wherein the second type positioning data determined with the processor comprises this information together with information about the signal strength with which the second type beacon signal was received.

10. The system according to claim 8, wherein the system is configured such that, in use, each second type beacon signal is transmitted at a predetermined time known within the system, wherein the second type positioning data determined with the processor comprises information about the time at which the second type beacon signal was received and/or that each second type beacon signal comprises information about the time at which the second type beacon signal was transmitted, wherein the second type positioning data determined with the processor comprises this information together with information about the time at which the second beacon signal was received.

11. The system according to claim 5, wherein the electromagnetic first type beacon signals and the second type beacon signals are identical, wherein one or more beacons are formed by fixedly disposed labels.

12. The system according to claim 1, wherein in use, a plurality of the labels are fixedly disposed and thus function as beacons, wherein the absolute positions of each label of the plurality of fixedly disposed labels are known within the system, wherein the system is configured to determine for at least two of the labels, on the basis of the electromagnetic first type beacon signals of the fixedly disposed labels received by the at least two labels, a position of each of the at least two labels relative to the fixedly disposed labels.

13. The system according to claim 1, wherein the system is configured such that the labels respectively, one after another, transmit the electromagnetic first type beacon signal during one or more transmission periods.

14. The system according to claim 13, wherein each label is provided with an electronic clock, wherein the electronic clocks of the labels are mutually synchronized and wherein the transmission period is divided into timeslots and wherein each of the labels is assigned a unique timeslot within the, or each, transmission period for sending the electromagnetic first type beacon signal.

15. The system according to claim 14, wherein each label is identifiable on the basis of the timeslot in which the label sent the electromagnetic first type beacon signal.

16. The system according to claim 13, wherein each label is configured for transmitting a synchronization signal and for receiving a synchronization signal from another label, and wherein each label is configured for, in response to the reception of the synchronization signal, sending a synchronization response signal for mutually synchronizing the labels.

17. The system according to claim 13, wherein each label is provided with an electronic clock, wherein the electronic clocks of the labels are mutually synchronized and wherein on the basis of signals generated by the electronic clocks the labels respectively one after another transmit the electromagnetic first type beacon signal.

18. The system according to claim 17, wherein the system is configured for transmitting a synchronization signal, and wherein each label is configured for receiving the synchronization signal and for synchronizing the electronic clock of the label on the basis of the synchronization signal.

19. The system according to claim 17, wherein each label is configured for generating a synchronization signal.

20. The system according to claim 1, wherein the system is configured such that, in use, a label only transmits an update of first type positioning data.

21. The system according to claim 1, wherein positioning data as determinable by each label with the aid of the processor comprises one or more data from a group comprising: information about the signal strength of a first type beacon signal received with that label, information about the signal strength of a first type beacon signal received with that label in combination with information about the signal strength with which the first type beacon signal was transmitted, information about the time at which the first type beacon signal was received, or information about the time at which the first type beacon signal was received in combination with the time at which the first type beacon signal was transmitted.

22. The system according to claim 1, wherein the transmitting and receiving device of each label is configured for transmitting and receiving electromagnetic signals with a frequency of less than 2.4 GHz.

23. The system according to claim 1, wherein the transmitting and receiving device of each label is configured for transmitting and receiving electromagnetic signals with a frequency of less than 1,000 kHz.

24. The system according to claim 23, wherein each label is configured for, during at least a part of a duration of the transmission of the electromagnetic first type beacon signal, sending the electromagnetic first type beacon signal such that it comprises merely a carrier wave.

25. The system according to claim 1, wherein each label is configured for sending along with the electromagnetic first type beacon signal an identification code for identifying a respective label.

26. A label of a system according to claim 1.

27. The label according to claim 26 comprising a processor and a transmitting and receiving device which is connected with the processor, wherein the label is configured for transmitting with the transmitting and receiving device an electromagnetic first type beacon signal, each label is configured for receiving with the transmitting and receiving device the electromagnetic first type beacon signal which has been transmitted by another label, each label is configured to determine first type positioning data with the aid of the processor of the label and that each label is configured to transmit with the transmitting and receiving device the first type positioning data determined by the processor of that label.

28. The label according to claim 27, wherein the label is configured to identify on the basis of the received electromagnetic first type beacon signal the label from which the received electromagnetic first type beacon signal originates.

29. The label according to claim 27, wherein the transmitting and receiving device of the label is configured for transmitting and receiving electromagnetic signals with a frequency of less than 2.4 GHz.

30. The label according to claim 27, wherein the transmitting and receiving device of the label is configured for transmitting and receiving electromagnetic signals with a frequency of less than 1,000 kHz.

31. The label according to claim 29, wherein each label is configured for, during at least a part of a duration of the transmission of the electromagnetic first type beacon signal, sending the electromagnetic first type beacon signal such that it comprises merely a carrier wave.

\* \* \* \* \*